(12) United States Patent
Spangrud

(45) Date of Patent: Sep. 11, 2007
(10) Patent No.: US 7,267,544 B2

(54) BARBEQUE GRILL BURNER WITH ENHANCED THERMAL DISTRIBUTION

(75) Inventor: Bruce Douglas Spangrud, Las Vegas, NV (US)

(73) Assignee: Outdoor Kitchen Concepts, Inc., Las Vegas, NV (US)

( * ) Notice: Subject to any disclaimer, the term of this patent is extended or adjusted under 35 U.S.C. 154(b) by 131 days.

(21) Appl. No.: 10/741,537

(22) Filed: Dec. 19, 2003

(65) Prior Publication Data

US 2005/0133018 A1 Jun. 23, 2005

(51) Int. Cl.
*F23D 14/62* (2006.01)
(52) U.S. Cl. .................. 431/354; 126/39 E
(58) Field of Classification Search .......... 126/41 R, 126/39 E, 39 R, 25 R; 431/354; 99/447
See application file for complete search history.

(56) References Cited

U.S. PATENT DOCUMENTS

| | | | |
|---|---|---|---|
| 3,871,355 A * | 3/1975 | Henry | 126/512 |
| 4,741,321 A * | 5/1988 | Squires | 126/9 R |
| 5,706,797 A * | 1/1998 | Moore et al. | 126/41 R |
| 5,711,663 A * | 1/1998 | Giebel et al. | 431/354 |
| 6,176,173 B1 * | 1/2001 | Holbrook et al. | 126/41 R |
| D475,552 S | 6/2003 | Thompson | |
| 2004/0065313 A1 | 4/2004 | Thompson | |

FOREIGN PATENT DOCUMENTS

DE 42 13 197 A1 * 4/1994
DE 29720168 U1 * 1/1998

OTHER PUBLICATIONS

English translation of German Patent No. DE 297 20 168 from Schreiber Translations, Inc. dated Sep. 2006.*
English translation of German Patent 42 13 197 A1 to inventor Ferl Polzer, dated Feb. 2006.*

* cited by examiner

*Primary Examiner*—Josiah C. Cocks
(74) *Attorney, Agent, or Firm*—Weide & Miller, Ltd.

(57) ABSTRACT

A gas burner for a grill unit includes a generally "U" shaped burner having spaced first and second hollow legs. The legs have a plurality of apertures therein through which gas may escape from the interior thereof for combustion. A gas delivery conduit delivers gas to a pair of arms. The arms extend outwardly from the conduit in generally opposite directions to the legs of the burner, whereby gas is delivered to both legs. The gas burner configuration results in even gas distribution, and thus even heat generation.

10 Claims, 9 Drawing Sheets

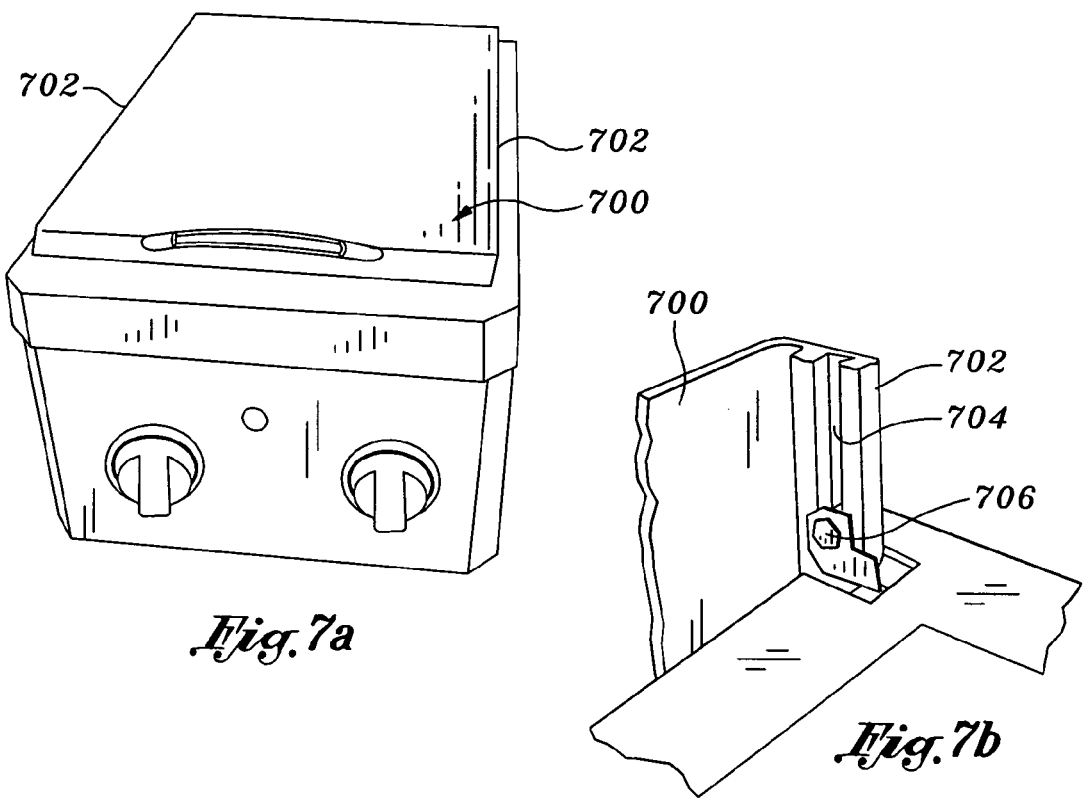
Fig. 7a
Fig. 7b
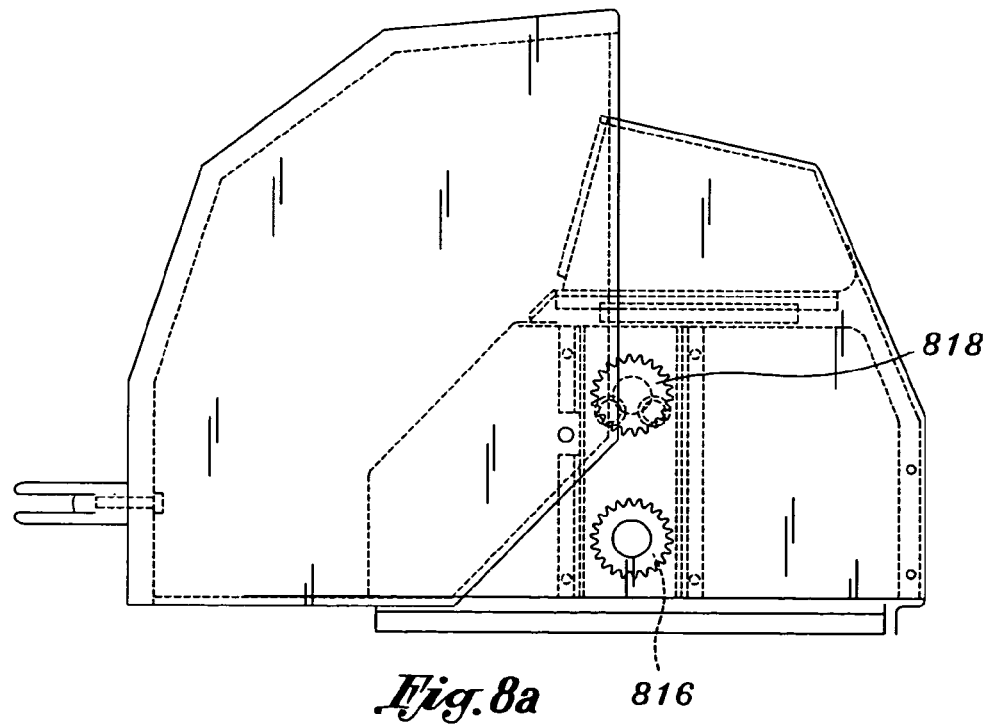
Fig. 8a

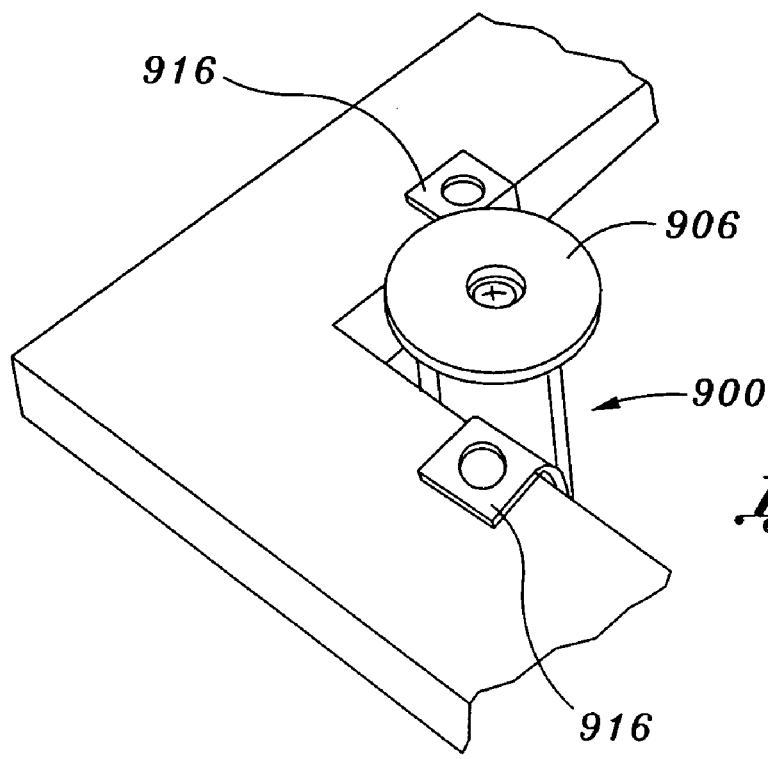
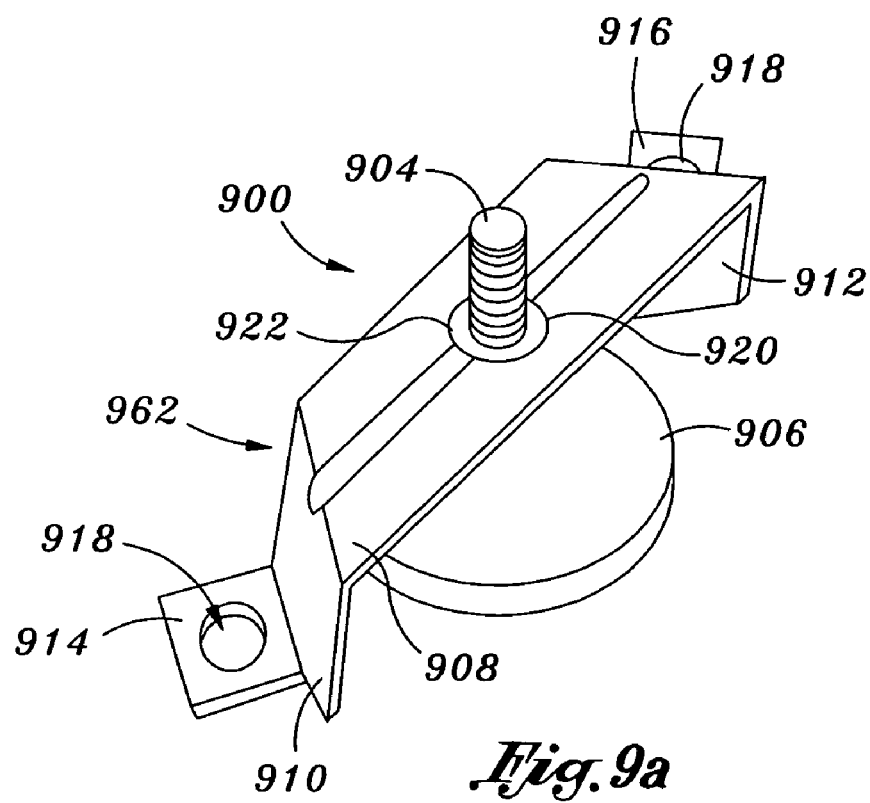

BARBEQUE GRILL BURNER WITH ENHANCED THERMAL DISTRIBUTION

FIELD OF THE INVENTION

The present invention relates to a method of constructing a barbeque grill and various barbeque grill features.

BACKGROUND OF THE INVENTION

Outdoor barbeque grill units are very popular and produced in a variety of configurations. These units include the well known brickette accepting type grill and gas or propane powered units.

Commonly, these grill units are constructed to be self contained, small and portable. The unit includes a stand which supports a grill housing, such as a metal casing. The housing, in turn, houses one or more burners and supporting racks. Generally, the housing includes a lid which may be opened to provide access to the interior, including the racks. The lid may be closed during cooking to retain the heat in the housing. Often, these grill units are mounted on wheels to allow the user to easily move the grill when it is not in use.

In order to increase the functionality of these units, they are offered with side burners, warming trays, storage areas and the like. This, of course, increases the size and complexity of the unit. This makes the units difficult to move and more difficult to construct.

More commonly, homeowners now desire custom "islands" which include grills and associated amenities. In some instances, homeowners still desire that the unit be movable. More frequently, homeowners desire that the unit be "built-in" or stationary. In either event, these homeowners generally desire that their grill have the appearance that the grill is more of a furnishing or structure, rather than a stand-alone appliance.

Various parties have sought to meet the needs of these homeowners. Instead of mounting grills upon simple legs or a stand, grills are mounted to cabinet structures. Generally, these cabinet structures comprise a framed box upon which the grill and associated components are mounted, the framed box also providing for interior storage space. There are several problems with this approach. First, these grill units are generally mass produced, each having the same configuration and dimensions. This does not allow a homeowner to request a "custom" unit having either specific features or a specific configuration or size. Second, various constraints limits the size of these units. In particular, these units can not be very large because they must be transported to the homeowner and installed at their home. The size and weight of the unit must be constrained to permit transport of the unit, including its passage through doorways and other structures and the home.

In other instances, the barbeque grill island or cabinet structure may be constructed where it is intended to be used. Generally, this entails the building of a wood frame structure, application of an outer finish, and installation of grill elements. This has the significant disadvantage that each unit must be custom created, greatly increasing the time and cost of the unit as compared to where the unit is pre-constructed only in a few configurations.

In addition, whether of the pre-constructed or custom-constructed configuration, these structures all suffer from a number of drawbacks. For example, a homeowner desiring a particular grill configuration can not see that configuration before it is created. Instead, the homeowner must communicate their desires to the builder and then wait and hope that the finished product, after being custom created, appears as desired.

Besides the supporting island or cabinet structure these types of grill, present grills suffer from a number of other problems. One problem relates to grill handles. As indicated, barbeque grills include lid which may be opened and closed. Because the lid is part of the grill housing, it becomes very hot during grill use. One or more handles are generally connected to the lid for use in opening and closing the lid.

Commonly, the handle is made of wood. A wood handle has the advantage that is does not transmit heat readily, allowing it to be gripped by a user even when the grill lid is very hot. A problem with such handles, however, is that if exposed to the weather, as is common for outdoor grills, the handle will weather and deteriorate. To avoid this problem, may grills are constructed with a metal handle. However, these handles often become too hot to touch, especially with newer grills having multiple burners and higher heat.

Another problem relates to grill burners. It is desired that the grill burner distribute heat and flame evenly over a large area. As grills and their associated burners have become larger, this goal has not been met with current burner configurations. Generally, the length of these burners is such that the gas pressure at areas close to the source is much higher than areas remote from the source, causing the generation of much higher flame and heat in one area than the other.

Many grills now include warming trays. These trays are platforms which may be located towards the top of the interior of the grill. Food items which a user desires to warm, rather than cook, may be located on the tray. These trays are often difficult to use. Among other things, food often gets pushed or rolls off of these trays. The food then falls to the grill below, where it is burned.

It is desired to provide a barbeque grill overcoming these and other problems.

SUMMARY OF THE INVENTION

The present invention comprises various barbeque grill components, and a method and system for constructing a grill island or support structure.

One aspect of the invention is a grill unit comprising a supporting structure comprising a plurality of individual modular units. Each modular unit comprises a frame, the frame comprising a plurality of interconnected elements generally defining a perimeter of the unit and an open interior and a covering extending over at least a portion of said frame, the covering enclosing at least a portion of the frame and the interior. The modular units are connected to one another to form a unitary structure, at least one of the frame elements of each modular unit configured for mating with a corresponding frame element of an adjacent modular unit. When assembled, the frame elements of the modular units define a generally contiguous front, top and rear of said grill unit.

In one embodiment each modular unit of the grill is configured to support specific grill equipment. For example, one modular unit is configured to support a cooking grill. Other units may be configured to support and/or enclose a refrigerator, trash bin, storage drawers or other equipment.

In one embodiment, the modular units used to construct the grill unit may be a sub-set of units selected from a larger number of possible units. The configuration of the grill unit may be changed depending upon the assembled order of the units. The modular units may be displayed in a showroom and configured according to a customer's desires to demonstrate the desired grill unit configurations. The modular units are then taken to the desired location and assembled.

In one embodiment, the size of each modular unit is selected so that the unit is easily transported and will pass through a door. At the desired location, the modular units are connected. A coating, such as stucco or tile, play be applied to the coating or covering upon the frames of the unit to finish the unit.

In one embodiment, each modular unit has a pair of sides and the frame of each modular unit at the sides are uncovered. Two of the modular units comprise end units, the end units having a outer covered side and an inner uncovered side of their frames, the uncovered sides of the end units connected to a corresponding uncovered side of another of the modular units.

One embodiment of the invention is a method of constructing a modular unit of a grill assembly. In one embodiment, the method comprises providing a first jig, the first jig having a generally planar support surface and a plurality of stops connected thereto. A plurality of frame elements are positioned upon the first jig in a predetermined configuration, the position of the frame elements defined at least in part by the position of the stops. The frame elements are connect to one another to form a side frame. A second jig is provided, the second jig configured to accept the side frame. The side frame is placed on the second jig and a covering is connected to at least a portion of the frame. Two side frames are connected with one or more cross-pieces, the cross-pieces spacing the side frames.

In accordance with this aspect of the invention, modular units may be constructed in assembly line fashion. Frame elements may be pre-cut or formed. Those frame elements are quickly placed into the necessary positions on the jig so that they form the exact frame structure desired.

Other aspects of the invention comprise grill components or elements thereof. One embodiment of the invention comprises a handle for a grill structure. The handle comprises a body having a central section located between a pair of ends, the ends curved away from the central section. Each end defines a generally planar surface facing in a first direction for connection to a lid of a grill. The body has an outer surface. A slot is formed in the outer surface facing in a second direction generally opposing the first direction, the slot being generally rectangular in cross-sectional shape and extending along a length of the central section.

Preferably, the handle is constructed from metal. When connected to a grill lid, the central section is spaced outwardly from the grill lid, the slot facing away from the grill lid.

The handle of the invention has the advantage that it is very durable and yet dissipates heat efficiently, permitting the handle to be touched even when the grill lid is extremely hot.

Another aspect of the invention is a burner, the burner configured to transmit gas such as propane, for burning. The burner comprises a burner conduit which is generally "U" shaped and has a first leg and second leg, the legs spaced from one another and the conduit having a plurality of apertures formed therein. The burner also includes a delivery conduit, the delivery conduit having a central section having a first inlet end and an opposing end and a first arm and a second arm. The first and second arms extend outwardly from the central section generally opposite one another along the central section from the first end, the first arm connected to the first leg of the burner and the second arm connected to the second leg of the burner.

The burner effectively distributes gas evenly throughout the burner conduit, whereby the heat generated along the entire burner is generally equal.

Another aspect of the invention is a rotisserie. The rotisserie comprises a spit having a first end and a second end. The rotisserie includes a support rollably supporting the first end of the spit, the support connected to a portion of the grill. The rotisserie also includes a spit drive driving the second end of the spit. The spit drive includes a drive element and a drive transmission. At least a portion of the drive transmission is located in a housing and the drive transmission includes a socket for accepting the second end of the spit, whereby when the drive element drives the drive transmission, the drives transmission rotates the second end of the spit, and the first end of the spit correspondingly rotates upon the support.

In one embodiment, the drive transmission includes a first gear and a second gear, the first gear connected to the second gear with a drive element such as a chain. Preferably, both the first and second gears and the drive element are located in the housing.

In one embodiment, the housing comprises a hollow side wall or side structure of the grill. The first and second gears are mounted upon a support structure within the hollow portion of the housing.

Another aspect of the invention comprises a warming tray for use in a grill. The warming tray comprises a generally planar support having a top and a bottom, a front edge and rear edge and a pair of sides. The rear edge comprises an upturned lip, the lip extending upwardly and inwardly towards said front edge.

In use, the warming tray is positioned inside of a grill. The lip abuts a grill lid, the lip preventing food items from being pushed or rolling off of the warming tray at the rear of the grill.

Another aspect of the invention is a burner lid for use in selectively covering a burner of a grill when said burner is not in use. The burner lid comprises a lid body configured to cover the burner when positioned over the burner, the body having a first side and a second side.

A first elongate slot is formed in the first side and extends therealong and a first pin is connected to a support structure supporting the burner, the pin extending into engagement with the first slot. A second elongate slot is formed in the second side and extends therealong, the second pin connected to the support structure and extends into engagement with the second slot.

The mounting configuration of the burner lid permits the body of the lid to be pivoted upwardly from a position in which it extends over the burner to a position in which it is raised from the burner, and whereby the lid body may be slid along the first and second pins until the body is recessed from the burner.

Yet another aspect of the invention is a leveling foot. The leveling foot is particularly suited for use in leveling a modular unit of a grill structure constructed from a plurality of assembled modular units, each modular unit comprising a frame with a covering, the frame including at least two frame elements defining a lower portion thereof, and at least two frame elements connected to one another and extending perpendicular to one another. In one embodiment, the foot comprises a body comprising a central mounting section having a first end and a second end, the ends extending along lines which intersect generally perpendicular to one another. A first leg extends downwardly from the first end of the central mounting section and a second leg extends downwardly from the second end of the central mounting section.

A first tab extends outwardly from the first leg and a second tab extends outwardly from the second leg, the first and second mounting tabs extending in a plane generally parallel to plane containing the central mounting section, whereby the first and second tabs may be connected to the frame elements and the central mounting section spans a space between the frame elements.

The foot also includes a stud connected to the central mounting second of the body and a pad connected to the stud. The stud is movable with respect to the central mounting section from a position in which the pad is retracted to a position in which the pad is extended away from the body.

One aspect of the invention is a bracket for use in connecting the modular units. The bracket is configured to connect two or more adjacent support elements, such as frame studs, of modular units. The bracket provides a secure mechanical connection for the modular units.

Further objects, features, and advantages of the present invention over the prior art will become apparent from the detailed description of the drawings which follows, when considered with the attached figures.

DESCRIPTION OF THE DRAWINGS

FIG. 7(a) illustrates a burner lid of the invention;

FIG. 7(b) illustrates a mounting for the burner lid illustrated in FIG. 7(a);

FIG. 8(a) is a side view of a grill having a rotisserie unit of the present invention;

FIG. 9(a) is a perspective view of a leveling foot of the invention;

FIG. 9(b) is a perspective view of the leveling foot illustrated in FIG. 9(a) mounted to a frame.

DETAILED DESCRIPTION OF THE INVENTION

The invention includes methods and apparatus for constructing barbeque grill units and various features of such units. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One aspect of the invention is a method of creating modular grill unit elements. Another aspect of the invention is a method of creating barbeque grills from modular elements.

Figure 1:
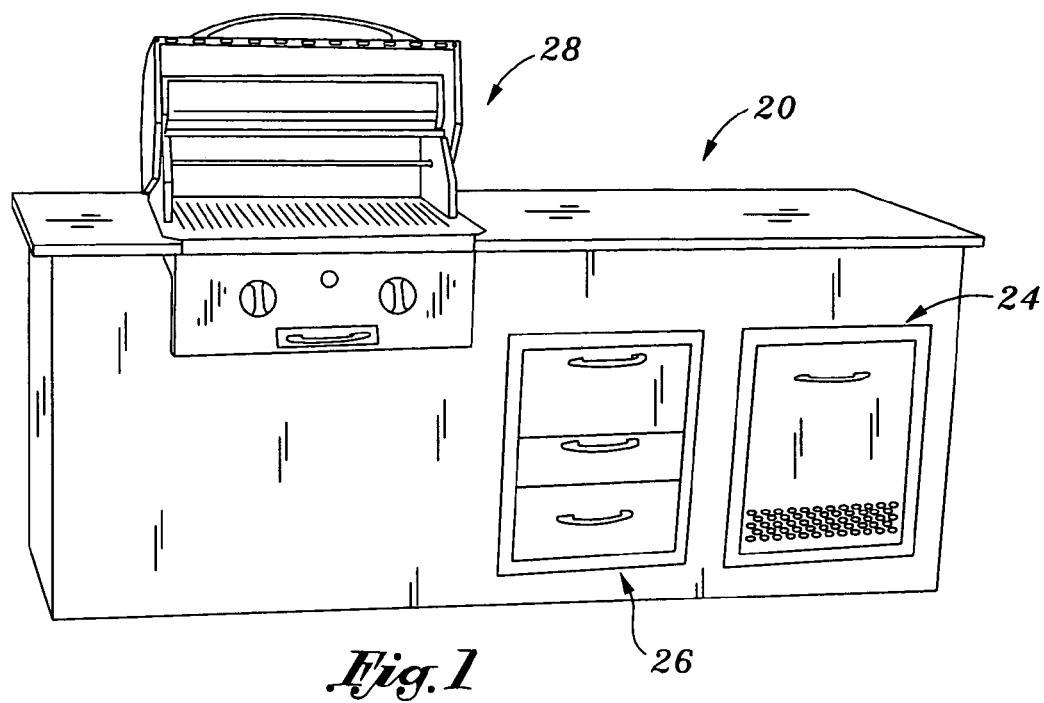
FIG. 1 is a perspective view of a barbeque or grill constructed in accordance with an embodiment of the invention.

FIG. 1 illustrates one embodiment of a grill or barbeque unit 20. As illustrated, the unit 20 has a base 22 which rests upon a supporting surface, such as a patio. The base 22 supports one or more grill components. As illustrated, the supported components are a trash unit 24, a drawer unit 26 and a grill 28. The grill 28 preferably comprises a cooking grill of the type which comprises a generally enclosed housing. A portion of the housing is preferably defined by a movable lid. An interior of the housing is heated with one or more burner elements, such as gas burners which transmit and release natural gas or propane for burning.

In general, the base 22 is a solid supporting structure. As illustrated, the base 22 is preferably enclosed and defines and finished outer surface. The base 22 may be referred to as an island or cabinet.

In accordance with the present invention, the grill unit 20 is constructed from a plurality of modular elements or units. In one embodiment, a variety of different modular elements or units are provided, providing for a nearly infinite number of resulting grill unit configurations constructed from one or more of the modular units.

Figure 2:
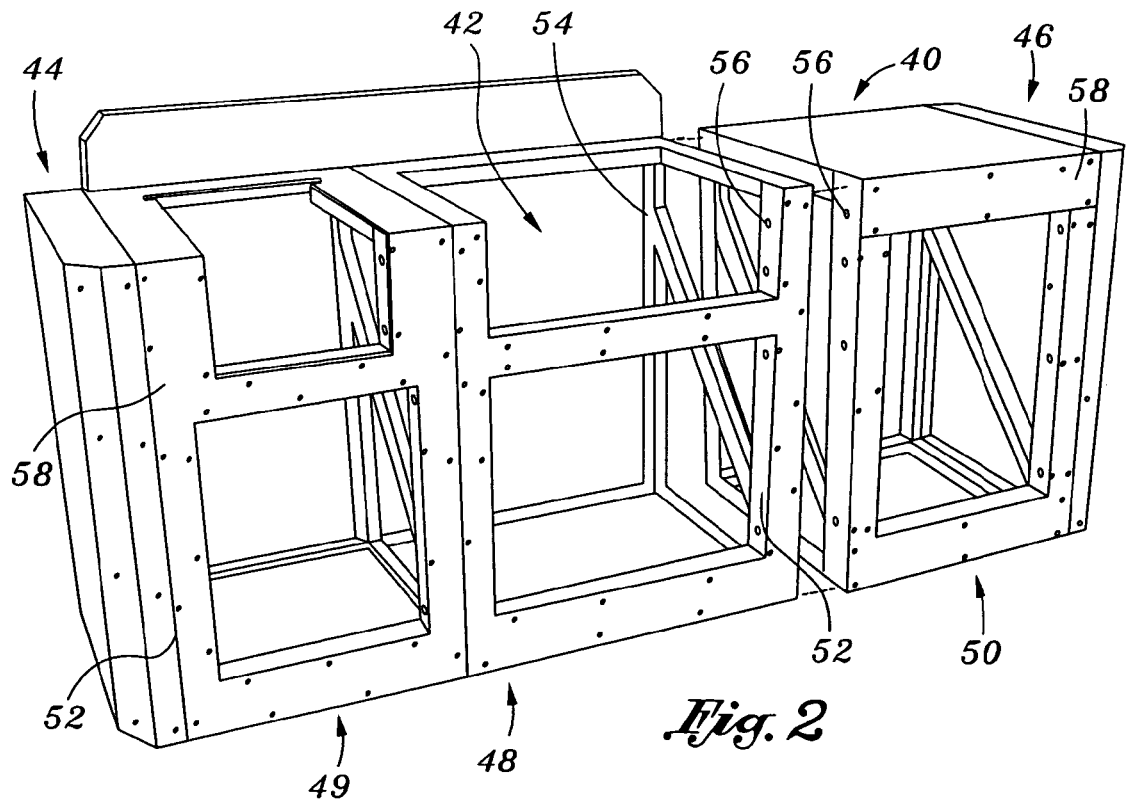
FIG. 2 illustrates modular units utilized in the construction of a grill in accordance with the invention.

One embodiment of a modular unit will be described with reference to FIG. 2. FIG. 2 illustrates a plurality of modular units 40. Each modular unit 40 has certain similarities. First, each modular unit 40 includes a supporting framework 42. Second, each modular unit 40 includes means for connecting it to another modular unit. As described below, each modular unit 40 also includes a covering over all or a portion of the framework 42 for enclosing the unit 40.

FIG. 2 illustrates four particular modular units 40: a first end unit 44, a second end unit 46, a grill unit 48, a burner unit 49 and a trash unit 50. The frame 42 of each unit is preferably constructed from hollow galvanized steel studs 2" by 4" in cross-sectional dimension. Preferably, these studs are cut to size and connected to one another, such as with metal screws, to form the frame 42 for each modular unit 40.

The particular configuration of the frame for each modular unit 40 may differ depending on the intended use of the unit. For example, in the case of the grill unit 48, the frame work defines an opening at a front and a top to accommodate a grill, as illustrated in FIG. 1.

Generally, the frame 42 of each modular unit 40 includes one or more frame elements for defining a base, top, opposing sides, a front and a back thereof. The portion of the frame 42 defining the base is preferably configured to support the modular unit 40. As illustrated, this may comprise a number of frame elements forming a base perimeter.

The portions of the frame 42 defining the front and rear are preferably configured to support a covering and one or more grill components. Similarly, the portion of the frame 42 defining the top is configured to define a covered top surface and/or support one or more grill components.

Preferably, the modular units 40 are sized for easy transport and assembly, and so that when assembled, mating modular units define a contiguous element. In one embodiment, the modular units 40 have a depth of no more than 36 inches, permitting them to be transported through standard doorways. In one embodiment, the height of the modular units 40 also is no more than about 36 inches. The exact height of the units 40 may depend, however, upon the application.

In the preferred embodiment, the modular units 40 are pre-constructed and then transported to the assembly site. A preferred embodiment for constructing the modular units 40 is described in more detail below.

As described above, the modular units 40 are preferably constructed for connection to one another. In one embodiment, each modular unit 40 includes at least one commonly located support element. As illustrated in FIG. 2, each modular unit 40 includes a upwardly extending front and rear supports 52,54. The front and rear supports 52,54 of each modular unit 40 are located the same distance from one another.

In one embodiment, the units 40 may selectively be connected using fasteners. In one embodiment, the front and rear supports 52,54 of each modular unit 40 include one or more passages or apertures 56. These passages 56 align with one another when the modular units 40 are located side-by-side with their front and rear supports 52,54 positioned adjacent one another. In this configuration, fasteners may be passed through the passages 56. The fasteners, such as screws or nut/bolt combinations may be used to secure the modular units 40 to one another.

As indicated, the frame 42 of each modular unit 40 is preferably created or configured to support one or more grill elements. For example, as illustrated in FIG. 2, one of the modular units 48 defines an opening at a front and top thereof for accepting therein a grill unit as illustrated in FIG. 1. Similarly, a second of the modular units 50 defines an opening at front thereof for accepting a trash unit as illustrated in FIG. 1.

Preferably, the frame 42 of each modular unit 40 defines a perimeter supporting structure. An interior space within each frame 42 is generally open for housing components and/or to reduce the total weight of the modular unit.

When constructed, it is desirable for the constructed grill unit 20 to be enclosed. Because the frame structures 42 are open, a covering 58 is applied to the modular units 40. One aspect and advantage of the frame construction of the modular units 40 is that not all surface thereof need to be covered. Referring to FIG. 2, when two modular units 40 are connected side-by-side, their open frames may be connected directly to one another without any covering because those sides are not exposed. In addition, it is generally not necessary to cover the base portion of the frame 42, though it may be desirable to add an interior "floor" when the interior of the modular unit 40 is used for storage.

Preferably, the other areas such as the exposed top, front and rear are covered. In one embodiment, the cover 58 may comprises a fire-resistant or retardant wall board. The cover 58 may be affixed to the frame 42 with fasteners such as screws.

In one embodiment, the exposed sides of connected modular units 40 are preferably covered. Covering may be applied for this purpose. In a preferred configuration, specially configured end units 44,46 are connected to the exposed sides of the modular unit or connected modular units. Preferably, the end units 44,46 again comprise a frame 42 including supports configured for connection to corresponding supports of the other units 40. The side of the frame of the end unit 44,46 which is to be exposed, however, is preferably covered with a cover 58.

One embodiment of the invention a method of constructing a grill or barbeque using the modular units 40. First, a grill manufacturer may build each desired modular unit, such as using the preferred method described below. The modular units may be displayed on a showroom floor. In a preferred configuration, the modular units are mounted upon wheels or rollers so that they may be moved. The displayed modular units may be enclosed on all sides, for reasons which will become apparent.

Preferably, the modular units may be selected and then rolled into position to create various simulated grill configurations. In particular, a customer may select various of the modular units and roll them into a first configuration. The customer may select other units or change the arrangement of the units to create other configurations. In this manner, the customer may actually see various completed grill unit configurations before such a configuration is assembled at their home. This allows the customer to be sure that their desires are met.

As described, the sides of each modular unit may be covered so that no matter what configuration the modular units are arranged into, the sides of the assembled configuration are closed, much in the same manner as the completed structure will be when assembled.

Once the customer has selected a particular grill configuration, the configuration may be assembled at the desired location, such as the customer's home. Preferably, each modular unit which is to comprise the assembled grill is constructed, such as in the manner described below. These modular units are then transported to the customer's home. Because of their size and construction, each modular unit is lightweight, and thus easy to load and transport. In addition, because of the size of each modular unit, the units are conveniently transported through doorways and other passages, such as through a home to a rear patio.

At the desired site, the modular units are connected to one another. As described above, this is preferably accomplished with the use of fasteners connecting mating portions of the units. As described, the assembly preferably includes end units which close the ends of the assembled unit.

Once the modular units are assembled, a generally enclosed support structure is defined. In one embodiment, part of the construction of the modular units includes not only forming the frame and covering thereof, but mounting grill unit components, such as drawers, trash bins, a grill or other elements. In one embodiment, some or all of these components are associated with their corresponding units before the units are assembled. In another embodiment, such components are not associated with the units until after the units have been assembled.

As described, the covering of the units is an unfinished covering. This allows each customer to customize the finish of the grill unit to their desires. For example, in one embodiment a synthetic stucco is applied to the covering. The synthetic stucco may be pre-colored or be painted after application. Other finishes may be applied, such as stone, tile or the like.

In the preferred embodiment, after finishing, the grill components are connected to the assembled grill unit. This may include the connection of a gas line to the grill, connection of electrical lines and the like.

As described, the assembled unit is mounted upon a support surface. In one embodiment, the assembled unit may be permanently connected to the surface, such as with bolts. In another embodiment, wheels, rollers or the like may be connected to the modular units, permitting the assembled unit to be moved.

In one embodiment, the modular units are mounted on feet. A preferred configuration of a foot of the invention is illustrated in FIGS. 9(a) and 9(b) and described in detail below. Preferably, the feet are adjustable, permitting the assembled unit to be leveled even when the supporting surface is not level.

The grill unit assembly and method of construction have, as indicated, numerous advantages. The modular construction permits pre-assembly into various configuration for visualization of the ultimate assembled configuration.

The modular construction also reduces the time and cost associated with grill unit construction. While only a certain number of pre-configured modular units need to be constructed, a nearly limitless variety of end configurations can be desired. Because the modular units are pre-configured, however, they may be mass constructed in a manner which saves time.

The modular construction has the advantage that each unit has its own supporting framework. Each frame is sufficient for the modular unit to be self-supporting. When connected, the assembly is then even stronger. This contrasts with custom-configured grill structures where the structure generally comprises a single free-standing open frame structure. The structure may have long open spans, reducing the strength of the structure in certain areas.

Because the modular units are specially configured to be assembled to one another, they may be quickly connected at the desired location. No hole drilling or other special work needs to be done to connect the units, again saving time.

Because of the open frame construction, including interior non-covered sides of the units, not only are the modular units strong and light-weight, but the assembly is light-weight. This permits the unit to be easily moved if that is necessary.

Another aspect of the invention is a method of constructing the modular units of the invention. One embodiment of the invention will be described with reference to FIGS. 3(a) and 3(b).

Figure 3A:
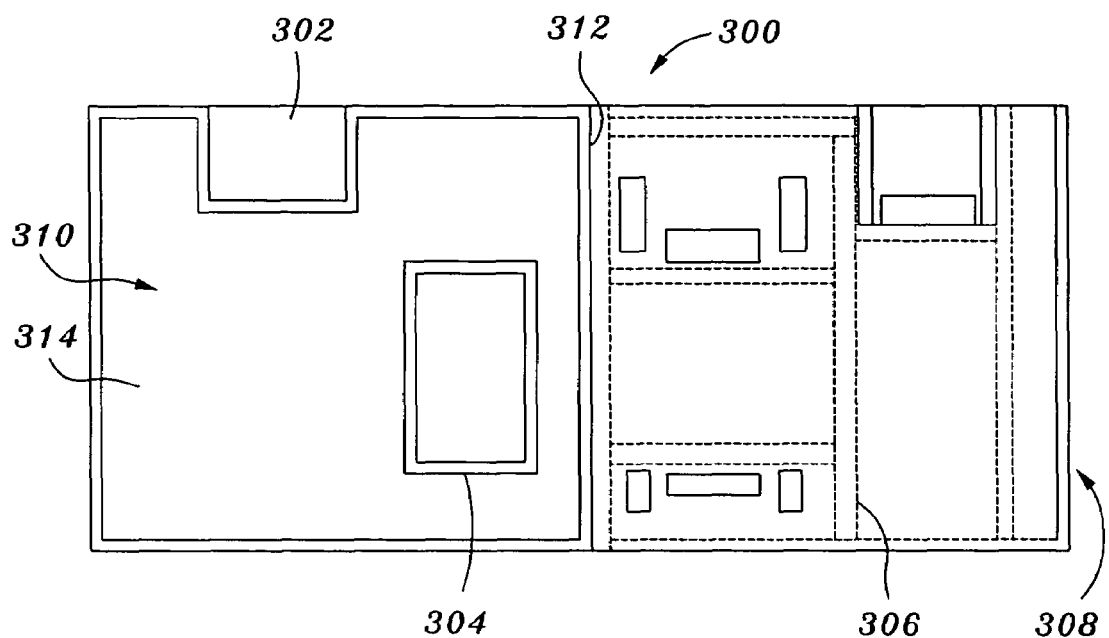
FIG. 3(a) is a plan view of a jig of the invention for use in constructing a grill modular unit.
Figure 3B:
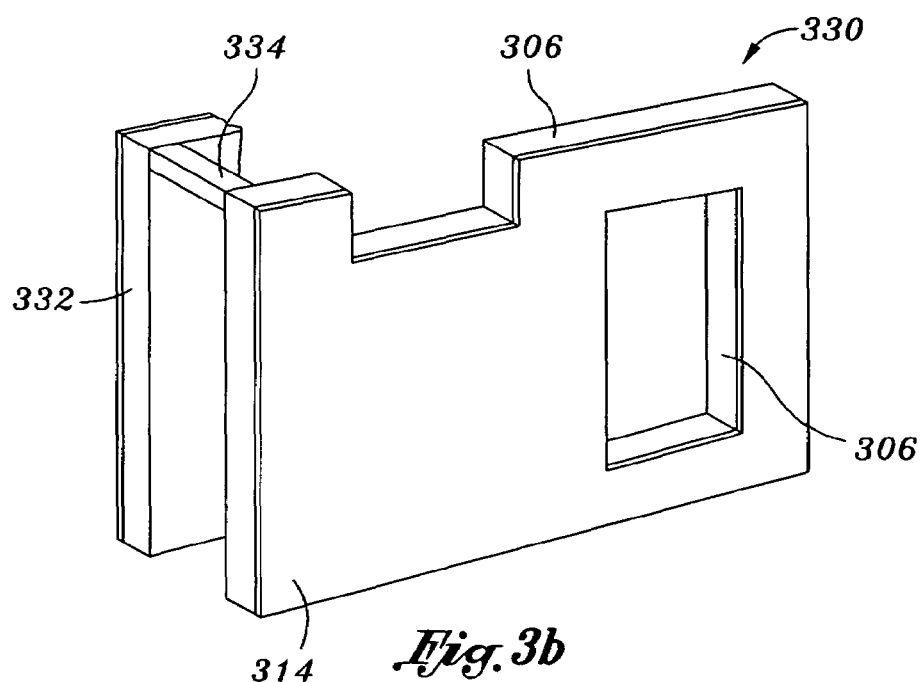
FIG. 3(b) is a perspective view of a portion of a modular unit constructed utilizing the jig illustrated in FIG. 3(a)

FIG. 3(a) illustrates a jig 300. The jig 300 comprises a "template" for use in constructing at least a portion of a frame. In a preferred embodiment, the constructed frame comprises a portion of a modular unit such as that illustrated in FIG. 2 and described above.

The jig 300 includes a base 302. In a preferred embodiment, the base 302 comprises a generally planar support surface. The base 302 may be oriented in a variety of positions. In a preferred embodiment, the base 302 is supported on a stand (not shown) such that it angles upwardly between horizontal and vertical, such as an angle of 45-60 degrees. In one embodiment, the base 302 comprises a supporting frame and flat sheeting, such as plywood, which forms the planar work surface.

In a preferred embodiment, various stops 304 are affixed to the base 302 and extend outwardly therefrom. In one embodiment, the stops 304 comprise "L" shaped angle iron members which are affixed to the base 302 with fasteners such as screws. The stops 302 comprise members which are used to support various frame elements and/or align various frame elements which are located on the base 302.

Importantly, the stops 304 are affixed to the base 302 in positions so that they support and/or align the various frame elements in the desired positions necessary to create the frame. In one embodiment, a stop 304 may extend along the edges of the base 302, thus forming a supporting/stopping perimeter. Various other stops 304 are located interior to this perimeter.

It will be appreciate that the configuration of the jig 300 may vary depending upon the particular frame which is to be constructed. The particular configuration of the jig 300 is useful in constructing a portion of a frame of the grill unit 48 illustrated in FIG. 2.

In this embodiment, frame elements 306 are positioned against the base 302 and against and/or around the stops 304 in order to form the desired frame. As described above, the frame elements 306 may comprise metal studs or the like. Preferably, the frame elements 306 are cut or formed to length and then positioned in the jig 300. The frame elements 306 are then connected to one another, such as with fasteners or welding.

In the example illustrated, the grill unit 48 includes a central opening. As such, stops 304 are associated with the base 302 in positions such that, when frame elements 306 are mounted thereabout, the frame elements form the opening.

In order to aid the user in arranging the frame elements 306 around and against the stops 304 to form the desired frame configuration, the locations of the frame elements may be drawn or depicted on the base 302, such as in an outline format. The outline may also include an indication of the particular frame elements 306 to be positioned in each location, such as by an identifier such as a frame element number. In this manner, the user may simply obtain required frame elements, positioned them in the correct locations on the jig 300, and then fasten them together.

The embodiment jig 300 illustrated in FIG. 3(a) is preferably configured for use in assembling the frame elements and the associate covering. As such, the jig 300 includes a frame section 308 and a covering section 310. The frame section 308 includes stops 304 configured for use in arranging the frame elements.

As described above, the frame of a constructed modular unit is covered with a covering. In accordance with the invention, once a particular frame section is constructed, the covering may be applied using the jig 300.

The covering section 310 includes stops 304 configured to accept the frame section assembled on the frame section 308 of the jig 300 in "reverse" position. In other words, the location of the stops 304 are mirror imaged about an axis 312.

In use, the assembled frame section 308 is turned over by rotating it from the frame section 308 to the covering section 310 of the jig 300 about the axis 312. The frame section then rests upon the jig 300 so that an exterior thereof faces outwardly. A covering 314 such as that described above may then be affixed to the framing section. In one embodiment, the covering 314 may be pre-cut, such as with desired openings. The covering 314 may then be positioned on the frame section and attached with fasteners or the like.

In accordance with the invention, multiple jigs 300 of different configurations may be used to construct the frame sections forming the frame of a single modular unit. As indicated, FIG. 3(a) illustrates a jig 300 for use in constructing the front portion of a frame of a grill unit 48 as illustrated in FIG. 2.

A similar but differently configured jig 300 may be used to construct a back frame section of the frame. As illustrated in FIG. 3(a), the constructed front and rear sections 330,332 may then be connected with one or more cross-pieces 334. It will be appreciated that this configuration is advantageous because the sides of the modular units of the invention are not covered. As such, once the front and back sections of the frame are covered and then connected by any side or cross-pieces, the modular unit is in constructed form.

This aspect of the invention has numerous advantages over the prior art. As described above, in the prior art grill units generally comprise one component or structure, or when larger, comprise a custom built component. In the case of large outdoor grill structures, a supporting frame is generally custom assembled. This requires the assembler to custom form or cut frame pieces and then connect them to one another without regard to any particular sequence or configuration. As a result, these frameworks generally take a great deal of time to construct, and each being different from the next, without regarding to the most efficient frame configuration when considering the strength, durability or ease of assembly. In essence, each frame structure is assembled as a trial and error project.

In accordance with this aspect of the invention, including the jig and method of use thereof, the modular units of the invention may be constructed in a very short period of time. This is because the multiple frame elements can be pre-formed or cut and their configuration is pre-determined. Further, each constructed modular unit is configured for the greatest ease of assembly. Each modular unit is also the same as the next, such that they are all compatible, as when connected to one another. In essence, the method of the invention results in the ability to "assembly line" create the modular units.

Various aspects of the invention comprise particular barbeque or grill features or elements. It will be appreciated that these features and elements may be used apart from one another or together, and may be incorporated into various grill or barbeque configurations, including a barbeque constructed as described above.

Figure 4:
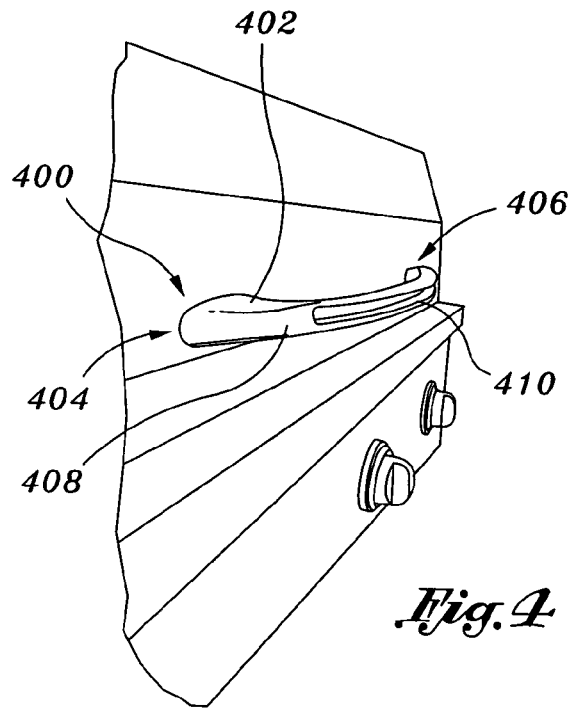
FIG. 4 is a perspective view of a grill lid handle of the present invention.

FIG. 4 illustrates a grill handle 400 of the invention. The grill handle 400 is particularly suited for connection to a grill lid for use in moving the grill lid between open and closed positions. As illustrated, the grill handle 400 comprises a body 402 having a first end 404 and a second end 406. The body 402 has an outer surface 408.

The handle 400 is desirably constructed from a durable, strong, weather resistant material. In a preferred embodiment, all or a portion of the body 402 of the handle 400 is constructed from metal. The handle 400 may be constructed from aluminum, stainless steel or the like.

In one embodiment, the body 402 of the handle 400 is somewhat "C"-shaped, curving at its ends 404,406. In one embodiment, the ends 404,406 are configured for connection to a grill lid, and as such curve inwardly so that a generally planar end surface thereof can be mounted flush to the grill lid. A central section of the handle 400 preferably extends between the ends 404,406. Because of the curving shape of the ends 404,406, the central section is positioned outwardly of a grill lid to which it is connected, permitting a user to grip the central section without contacting the grill lid.

In the embodiment illustrated, when mounted to a grill lid, a portion of the outer surface 408 faces towards the grill lid, and a portion faces outwardly. In a preferred embodiment, a portion of the body 402 between the ends 404,406 is removed. As illustrated, a slot 410 is formed in the body 402 in the portion of the grill lid which faces outwardly. In one embodiment, the slot 410 is generally rectangular in shape.

In one embodiment, the cross-sectional shape of the body 402 is circular.

The handle 400 of the invention has several advantages. A particular advantage of the handle 400 is that it dissipates heat. Thus, when connected to a heated item, such as a grill lid, the temperature of the handle 400 remains very low, permitting a user to grab or touch it without being burned. In particular, the reduced cross-sectional area of the handle 400 in the area of the slot 410 reduces thermal transfer. In addition, the slot 410 results in a greater outer surface area than if the body 402 were merely circular in shape, increasing the rate of heat dissipation to the air.

Figure 5:
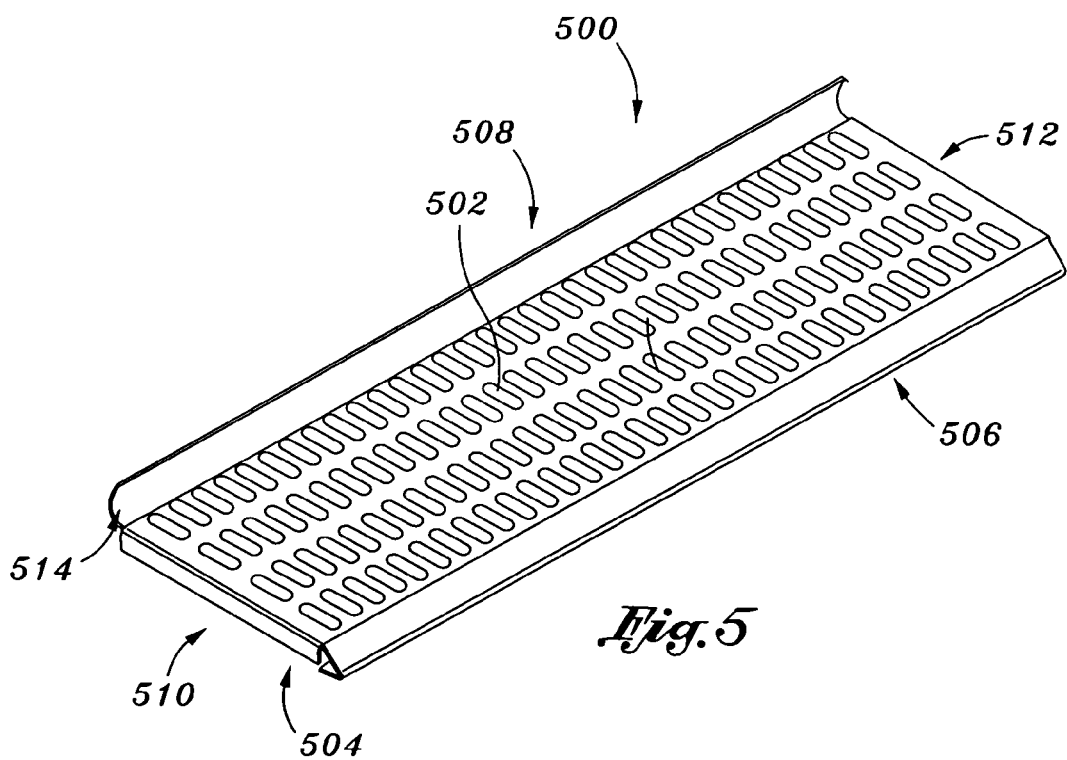
FIG. 5 is a perspective view of a warming tray of the present invention.

Another aspect of the invention is illustrated in FIG. 5. FIG. 5 illustrates a warming tray 500 in accordance with the invention. The warming tray 500 is configured to be placed inside of a grill unit and to support food items thereon for warming.

As illustrated, the warming tray 500 is generally planar, having a top surface 502 and a bottom surface 504. The warming tray 500 has a front edge 506, a rear edge 508, and a pair of opposing sides or side edges 510,512. In one embodiment, as illustrated, the front and side edges 506, 510,512 all include a under-turned lip, presenting a smooth, rolled edge to the user (rather than an abrupt sharp edge).

The warming tray 500 may be constructed of a variety of materials. Preferably, the tray 500 is constructed of a heat-durable material such as stainless steel.

As illustrated, the generally planar central section of the warming tray 500 may have a plurality of apertures therein to let heat therethrough, in a convective fashion. It is also possible for the tray to have a solid construction.

In accordance with the invention, the rear edge 508 of the warming tray 500 curves upwardly and inwardly. As illustrated, the rear edge 508 is defined by a lip 514. The lip 514 extends upwardly from the main generally planar portion of the tray 500, and bends forward towards the front edge 506 of the tray 500. In this configuration, the lip 514 has an inside surface and an outside surface.

The warming tray 500 of the invention has the advantage that food items are maintained on the tray when the tray is in use. As indicated, the tray 500 is preferably used within a grill. Generally, the tray 500 is located inside an open space in the grill above the burners and one or more cooking grills. In one embodiment, the tray 500 is configured to be located in a grill such that the lip 514 thereof abuts the inside of a grill lid (not shown). Advantageously, food items located on the top 502 of the tray 500 are prevented from being pushed, rolling or otherwise moving off of the rear portion of the tray 500 by the lip 514. These food items are caught by the lip 514 and maintained on the tray 500.

Figure 6A:
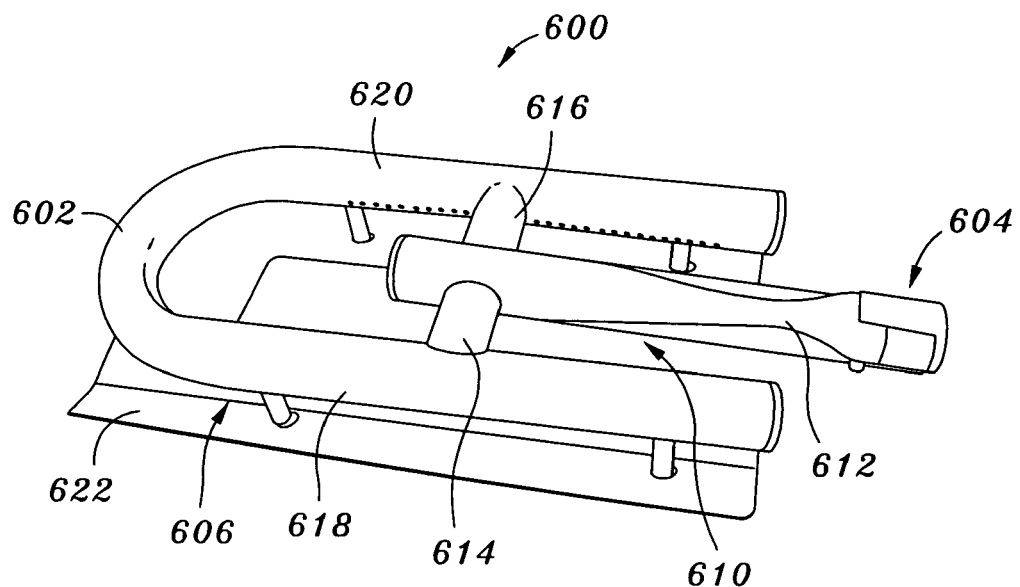
FIG. 6(a) is a bottom perspective view of a burner of the present invention.
Figure 6B:
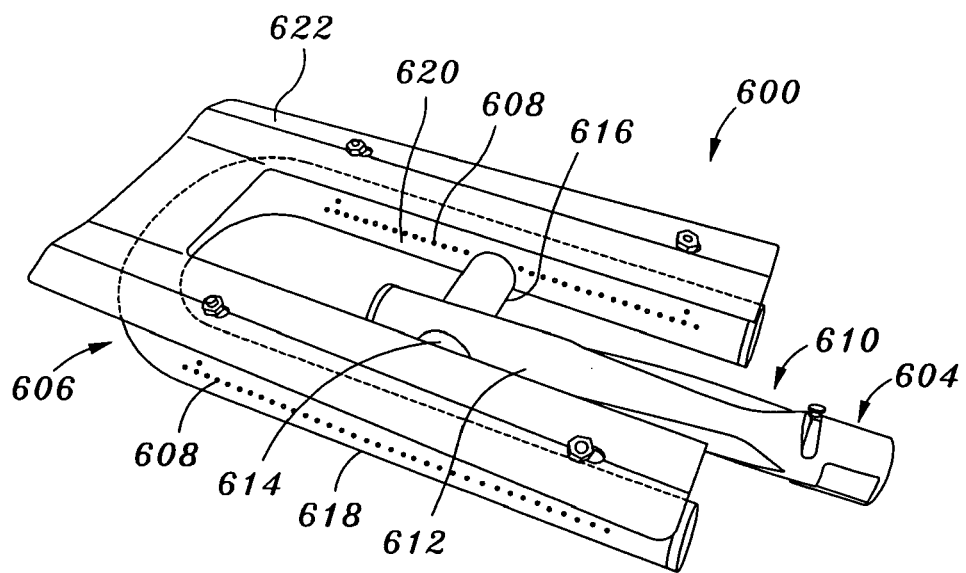
FIG. 6(b) is a top perspective view of the burner illustrated in FIG. 6(a)
Figure 8B:
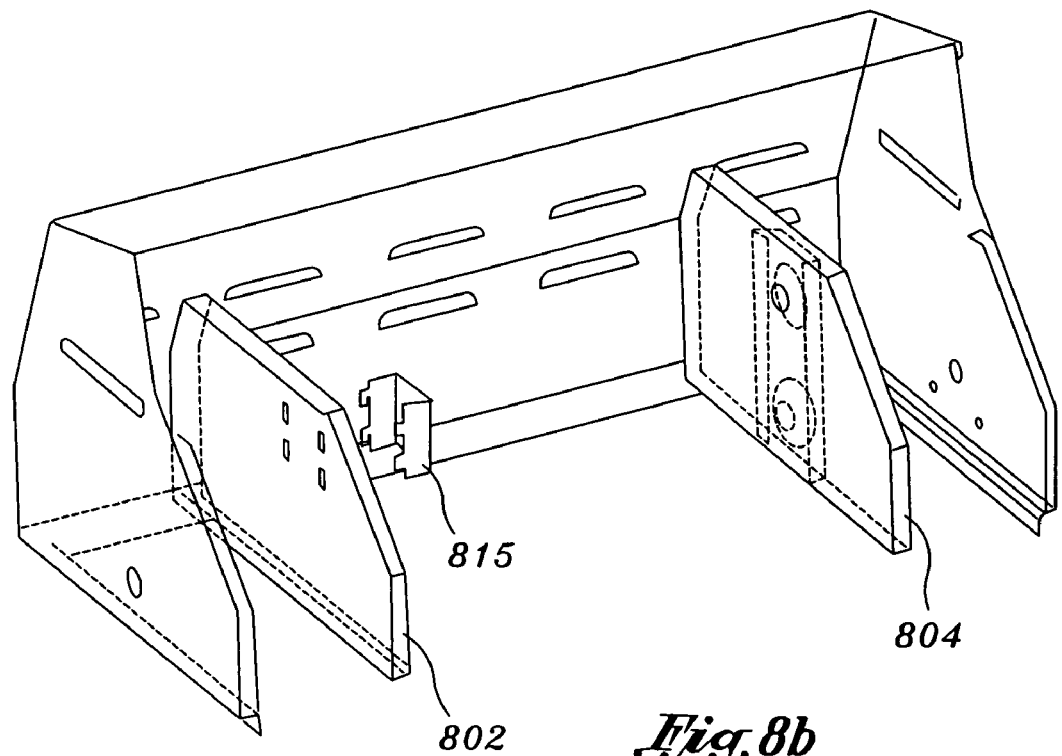
FIG. 8(b) is a partial perspective assembly view of the grill and rotisserie unit illustrated in FIG. 8(a)
Figure 8C:
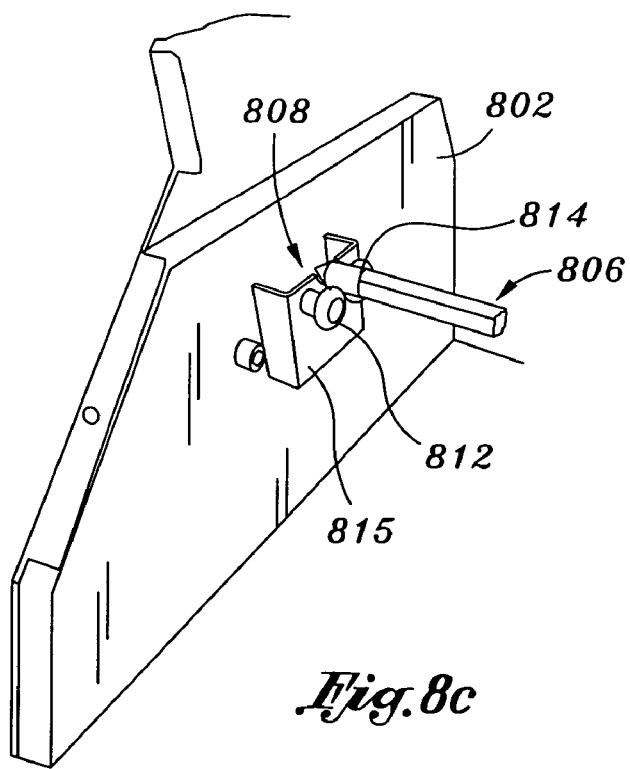
FIG. 8(c) is a perspective view of a first end of the rotisserie unit of the invention.
Figure 8D:
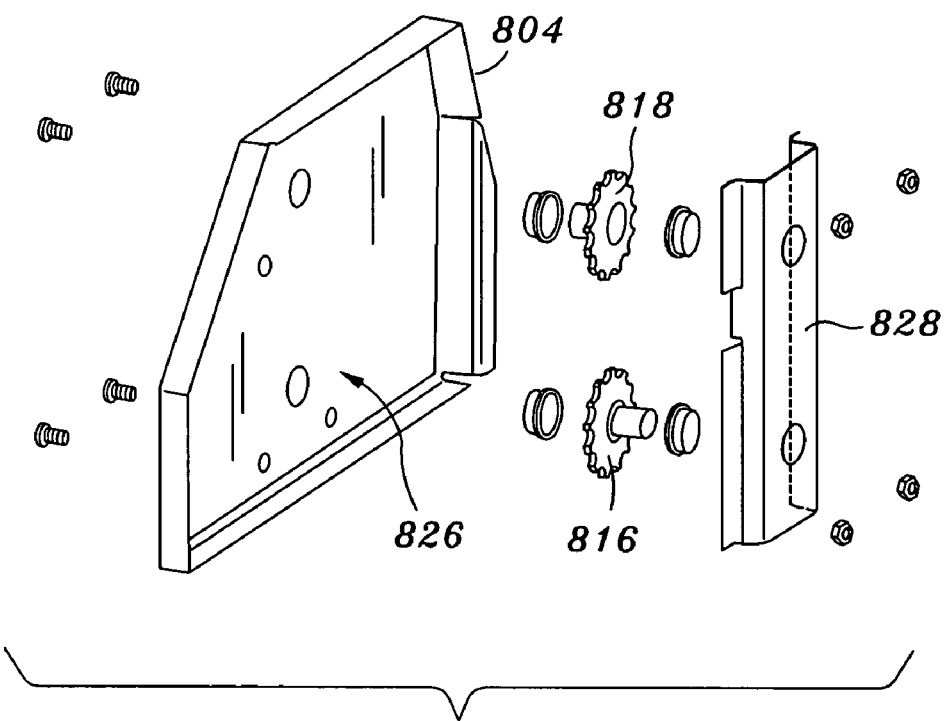
FIG. 8(d) is an exploded view of a second end of the rotisserie unit of the invention.
Figure 8E:
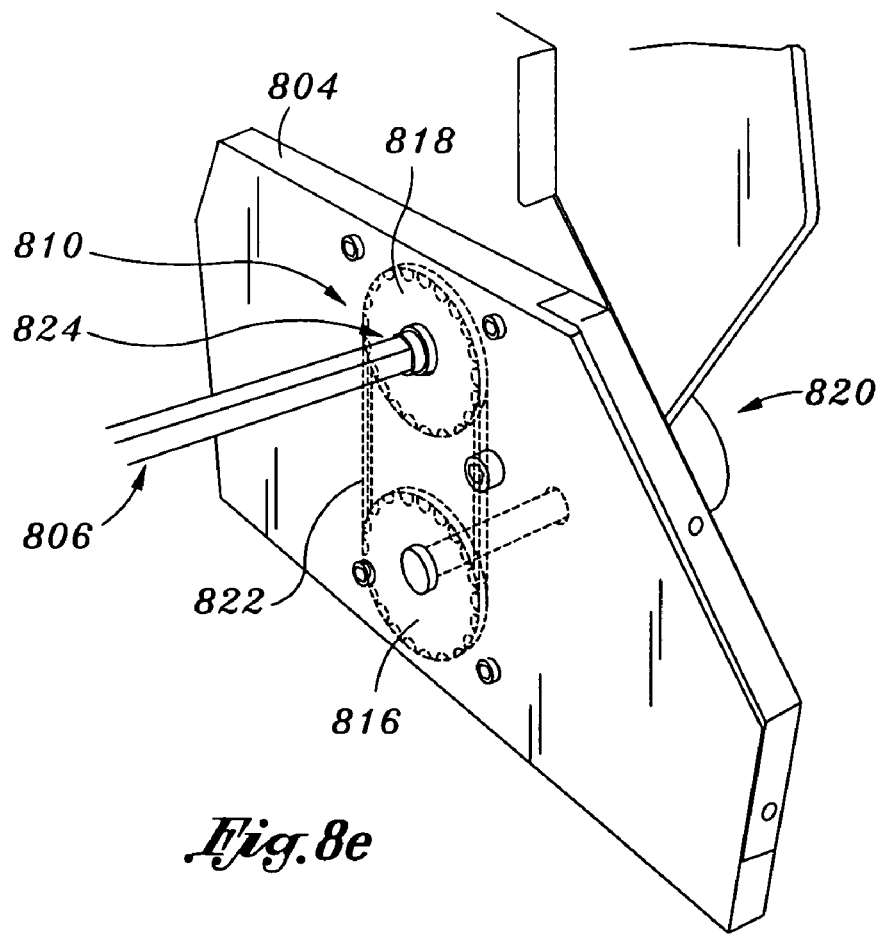
FIG. 8(e) is a perspective view of the second end of the rotisserie unit of the invention.

Another aspect of the invention a gas burner for a grill, barbeque or other cooking unit. A burner 600 of the invention is illustrated in FIGS. 6(a) and 6(b). The burner 600 includes a conduit 602 for transmitting gas, such as natural gas or propane. The conduit 602 may comprise a stainless steel pipe or similar element. In such a configuration, the conduit 602 is defined by a wall and has an open interior or passage through which gas may flow.

As illustrated, the burner 600 has an inlet 604 through which gas is delivered. The inlet 604 may be connected to a gas source in a variety of manners.

As illustrated, the conduit 602 includes a generally "U"-shaped gas burner section 606. The burner section 606 preferably has a pair of closed ends. As illustrated in FIG. 6(b), the burner section 606 has a plurality of apertures 608. The apertures 608 extend through the wall of the conduit 602 from an interior to the exterior thereof.

The number of apertures 608 may vary in size and in number, depending upon the application. For example, the size of the apertures 608 may vary depending on whether the burner 600 is configured to burn propane or natural gas. Preferably, one or more or all of the apertures 608 are located in a portion of the burner section 606 which corresponds to a top of the burner 600.

As illustrated, the conduit 602 includes a "T"-shaped delivery section 610. The delivery section 610 has a main section 612 defining the inlet 604. In addition, the delivery section 610 has a pair of arms 614,616 extending outwardly from the main section 612.

As illustrated, the burner section 606 has a first leg 618 and an opposing second leg 620. One of the arms 614 of the delivery section 610 leads to the first leg 618, while the other arm 616 leads to the second leg 620. Preferably, the arms 614,616 are aligned and are of generally the same length.

In one embodiment, a diverter or shield 622 is associated with the burner 600. The diverter 622 serves to spread heat created by the burning gas and prevent open flame from burning food being cooked.

In accordance with the burner 600 of the invention, gas is delivered through the inlet 604 to the main delivery section 612. The gas is then evenly distributed through the arms 614,616 to the burner section 606. The gas passes into the burner section 606 and is evenly distributed therein and then burns as it exits the burner section 606 through the various apertures 608.

A common problem when facing burner design is to create an even heat source over a large area. Because of the burner configuration, the flame/burn intensity at various locations of the burner 600 is generally equal. In particular, because of the "T" shape of the delivery section and its mating to the "U" shaped burner, gas pressure within the length of the burner section is generally equal, providing for even burner rate and heat.

Another aspect of the invention is an improved burner lid mounting. This aspect of the invention will be described with reference to FIGS. 7(*a*) and (*b*). Various grills, barbeques and other cooking devices include burners. The burners may be electric or gas powered. Often, it is desirable to protect a burner. For example, in the case an outdoor grill, the burner may need to be protected from the elements. A lid or cover may be located over the burner when the burner is not in use.

FIG. 7(*a*) illustrates a burner lid 700. The lid 700 may have a variety of shapes and configurations. In one embodiment, the lid 700 is generally rectangular in shape. The lid 700 has a pair of elongate sides 702. As illustrated, in one position the lid 700 is configured to extend over a burner.

Referring to FIG. 7(*b*), a slot 704 is formed in one, and preferably both, sides 702 at an interior thereof. Preferably, a pin 706 is connected to a lid support structure, such as a housing to which the burner is mounted. The pin 706 extends outwardly and engages the slot 704.

The lid 700 is preferably configured so that it can be moved from a first position in which it is generally horizontal and positioned over the burner to a raised position in which it is positioned upwardly from the burner, providing access to the burner. This movement is preferably accommodated by the position of the lid relative to the surrounding structure(s) and the rotatable mounting of the pin 706 in the slot 704.

In a preferred embodiment, the lid 700 can additionally be moved from its raised position to a stored position. A space may be provided for housing the lid 700. As illustrated, this space is defined by the burner support structure or housing, and is located behind the burner. In accordance with the invention, after the lid 700 is rotated to its raised position, the lid 700 may be slid downwardly into the storage space. This movement is facilitated by travel of the pin 706 along the slot 702 as the lid 700 is moved relative to the pin 706.

Another aspect of the invention is a rotisserie and rotisserie drive system which will be described with reference to FIGS. 8(*a*)-(*e*). As illustrated in FIGS. 8(*a*) and 8(*b*) a rotisserie system 800 of the invention is useful with a grill having a body with a lid.

Referring to FIG. 8(*b*), the rotisserie 800 is preferably mounted to a pair of walls 802,804. In one embodiment, the walls 802,804 may be side walls of the grill.

Referring to FIG. 8(*c*), the rotisserie 800 includes a spit 806. As illustrated, the spit 806 is an elongate body, preferably having the form of a rod. In one embodiment, the cross-sectional shape of the spit 806 is other than circular, such as square, so that food items placed thereon will rotate with the spit 806.

Referring to FIGS. 8(*c*) and 8(*e*), the spit 806 has a first end 808 and a second end 810. In one embodiment, the first end 808 of the spit 806 is a tapered head or point (i.e. having a circular cross-section which reduces in size). The rotisserie 800 includes means for supporting the first end 808 of the spit 806 for rotation. As illustrated, the means comprises first and second rollers 812,814.

As illustrated in FIGS. 8(*b*) and (*c*), in one embodiment, the rollers 812,814 are mounted to a bracket 815. The bracket 815 is, in turn, mounted to the grill, such as the wall 802 of the grill. The rollers 812,814 are mounted for rotation and are spaced from one another. As illustrated, the first end 808 of the spit 806 is supported by the rollers 812,814. In this configuration, the first end 808 of the spit 806 is rotatably supported by the rollers 812,814.

The rotisserie 800 includes means for rotating the spit 806. In one embodiment, the means comprises a drive for rotating the second end 810 of the spit 806. The drive includes a drive element and a drive transmission.

As best illustrated in FIGS. 8(*d*) and (*e*), the drive transmission includes a first gear 816 and a second gear 818. Means are provided for rotating the first gear 816. In one embodiment, this means comprises the drive element, namely an electric motor 820. The first gear 816 is configured to rotate the second gear 818. In one embodiment, this means comprises a drive chain 822 of the drive transmission. The second gear 818 is configured to drive the second end 810 of the spit 806. In one embodiment, a socket 824 is associated with the second gear 818. The socket 824 is configured to accept the second end 810 of the spit 806.

In the preferred embodiment of the invention, various of the component of the drive are enclosed in a housing so as to be protected from the elements and from contact with a user of the grill. As illustrated, the wall 804 of the grill is preferably formed with an interior space 826 in which the first and second gears 816,818 are mounted.

In one embodiment, referring to FIG. 8(*d*), the first and second gears 816,818 are mounted for rotation to a mount 828. The mount 828 is located in the interior space 826 and connected to the wall 804. The mount 828 may be connected to the wall with appropriate fasteners or by other means, such as welding.

As illustrated, an opening is provided in the wall 804 which provides access to or through which the socket 824 extends. Preferably, a similar opening is provided on the opposing side of the wall at the first gear 816. A similar socket or drive is provided for interfacing the motor 820 with the first gear 816.

In use, the motor 820 is connected to the first gear 816. The motor 820 turns the first gear 816, which turns the second gear 818 via the drive chain 822. The second gear 818 rotates the spit 806 via its connection at the socket 824.

Various other embodiments of the rotisserie 800 are contemplated. First, other drive means may be provided for driving or rotating the spit 806. The first and second gears

816,818 may be in a direct drive arrangement. The gears 816,818 may comprise pulleys which are connected via a drive belt. The motor 820 may be connected to a single gear which in turn drives the spit 806.

Preferably, however, one or more of the drive components are housed within an interior housing. As indicated, the housing preferably comprises an interior or exterior side wall of the grill. In other embodiments, the housing may be separate from the grill and may be attached or set upon the grill when used.

In accordance with the invention, the rotisserie drive components are protected from dirt, damage and from contact with a user. This configuration is aesthetically appealing, safer, and more durable.

As described above, it is desirable to level the grill unit of the invention when it is installed. One embodiment of the invention comprises a leveling foot 900. As described, the foot 900 is particularly suited to use in leveling one or more modular units having a supporting frame, as described above. The foot 900 may be used in other environments, however, including for use in leveling other types of grill structures and elements and items other than grills.

As illustrated in FIG. 9(*a*), the foot 900 includes a mounting body 902, a stud 904 and a pad 906. In general, the body 902 is configured to mount the foot 900 to a structure to be leveled. The stud 904 engages the body 902, the position of the stud 904 being movable relative to the body. The pad 906 engages a support surface. When the stud 904 is moved, the position of the pad 906 from the body 902 changes, allowing the position of the pad 906 to change relative to a support structure.

In a preferred configuration, it is desired that the body 902 be configured to mount to a corner portion of a structure. In one embodiment, the body 902 is particularly suited to mounting to frame elements of a frame such as that illustrated in FIG. 2, i.e. a frame of a modular grill unit.

As illustrated, the body 902 has a central mounting section 908. The central mounting section 908 is generally planar. A pair of legs 910,912 extend downwardly from the central mounting section 908 at each end thereof. Preferably, the legs 910,912 extend downwardly a distance greater than the minimum distance the pad 906 extends outwardly when the stud 904 is in it retracted position, for reasons described below.

Mounting tabs 914,916 extend from the legs 910,912. As illustrated, the legs 910,912 extend outwardly in a plane which is generally parallel to, but offset from, the central mounting section 908.

As illustrated in FIG. 9(*b*), the foot 900 is configured to mount to frame elements which are connected perpendicular or nearly perpendicular to one another. Preferably, the foot 900 fits within a corner space defined between the two mating frame elements.

As illustrated in FIG. 9(*a*), the ends of the central mounting section 908 are angled. In a preferred embodiment, the ends 908 are configured such that lines which extend along the ends intersect at a 90 degree angle.

The legs 910,912 preferably extend downwardly from the central mounting section 908 perpendicular thereto. The mounting tabs 914,916 extend outwardly generally perpendicular to the legs 910,912.

In this configuration, as illustrated in FIG. 9(*b*), the body 902 of the foot 900 is configured to fit between the two frame elements. The legs 910,912 engage the inner surfaces of the frame elements, while the central mounting section 908 extends through the corner space between the frame elements. The mounting tabs 914,916 are configured to engage the bottom surface of the frame elements. As illustrated, the mounting tabs 914,916 extend inwardly of an edge of the frame elements generally perpendicular thereto.

The body 902 may be connected to the frame elements with fasteners, such as metal screws. In one embodiment, each mounting tab 914,916, includes an aperture 918 for accepting such a fastener therethrough.

In one embodiment, the stud 904 comprises a rod. At least a portion of the external surface of the stud 904 is threaded. The threads of the stud 904 are configured to mate with corresponding threads on or associated with the body 902. In one embodiment, an aperture 920 is provided in the central mounting section 908, the inner surface of which is threaded. In a preferred embodiment, a nut 922 is connected to the central mounting section 908 at the location of the aperture 920, the nut defining an inner threaded passage. The nut 922 may be connected to the body 902 by welding or the like.

The pad 906 is preferably connected to an end of the stud 904 which is on the side of the central mounting section 908 facing the legs 910,912. In one embodiment, the pad 906 is a generally circular support. The pad 906 may have a variety of constructions. For example, the pad 906 may simply comprise a metal plate which is welded to the stud 904. In another embodiment, the pad 906 may have a supporting base, such as constructed of metal, and a non-slip, no mark plastic insert which defines a bottom surface thereof.

In a preferred embodiment, the pad 906 is connected to the stud 904 in a manner which permits it to rotate about an axis passing through the stud 904. The pad 906 may also be permitted to swivel or tilt relative to the stud 904 to conform to uneven support surfaces.

As described above, in use, the foot 900 is mounted to a structure. The body 902 is mounted so that it is recessed into the space between the frame elements. The body 902 may be connected to the frame elements as described above.

The stud 904 may be moved from a retracted to an extended position. In the retracted position, as described above, the pad 906 preferably does not extend below the mounting tabs 914,916, and thus does not extend beyond the bottom of the frame elements. Where the stud 904 engages the body 902 in a threading configuration, the stud 904 may be moved towards its extended position in an infinite number of steps or positions. As the stud 904 is moved to its extended position, the pad 906 extends outwardly beyond the bottom of the frame elements for contacting a supporting surface.

The stud 904 may be moved outwardly until it no longer engages the body 902. In another embodiment, the stud 904 may have a stop which defines its extended position. The stop may comprise, for example, the end of the threaded portion thereof or an enlarged head or the like at its end opposite the pad 906.

So configured, when structure is set into position, the pad 906 of the foot 900 may be lowered until it engages the support surface. It is desirable that the foot 900 be used at one or more corners or other location of the structure to support the structure at multiple locations. Each pad 906 of each foot 900 extending downwardly the particular distance for engaging the support surface.

As described above, in a preferred embodiment of the invention, a grill unit is constructed from a number of discrete or individual modular units which are connected to one another. In one embodiment, the modular units are connected with fasteners or the like.

Figure 10:
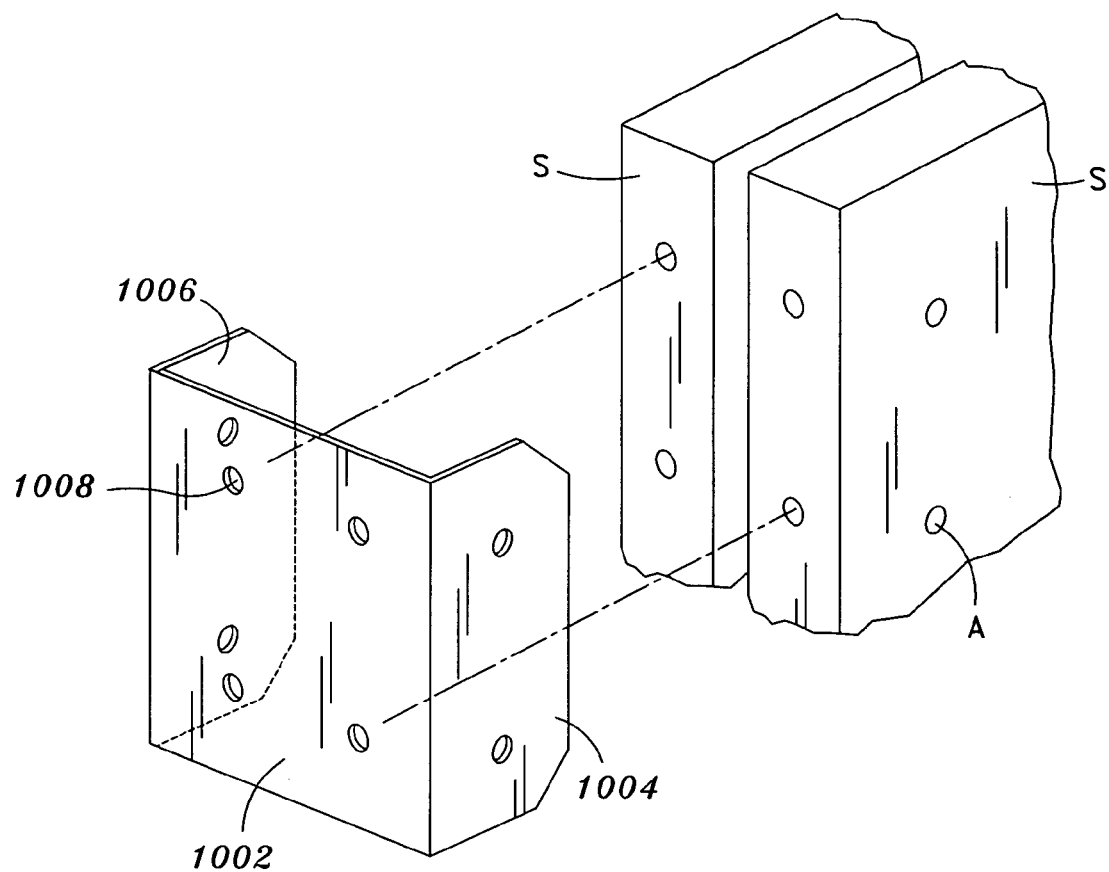
FIG. 10 is a perspective view of a bracket of the invention utilized to connect support elements of two modular units to be joined.

FIG. 10 illustrates another means for joining the modular units. The means comprises a bracket. In one embodiment the bracket is defined by a body having a central, generally planar section 1002 and a pair of outwardly extending flanges 1004,1006. The flanges 1004,1006 are spaced from one another and extend outwardly from the central section 1002 generally perpendicular thereto. The spacing of the flanges 1004,1006, and thus the width of the central section 1002, is preferably dependent upon the number of elements to be joined. In a preferred embodiment, the bracket is utilized to join stud or frame elements of one or more modular grill units. As illustrated, the bracket is configured to join to studs S. The spacing of the flanges 1004,1006 is preferably then sufficient so that the flanges extend along opposing sides of the two studs S. Of course, the flanges 1004,1006 would be spaced apart a greater distance if the bracket were being used to connect three adjacent studs or frame members. Preferably, the spacing of the flanges 1004, 1006 is such that the flanges 1004,1006 are located proximate or against the sides of the studs or other frame elements (and not spaced outwardly therefrom) when the bracket is connected thereto.

As illustrated, the bracket includes a plurality of apertures 1008 for accepting fasteners. Preferably, these apertures 1008 are configured for alignment with mating (pre-formed or post-formed) apertures in the studs or frame elements which are to be joined. As illustrated, in one embodiment, apertures are located in the central section 1002 and flanges 1004,1006 of the bracket for alignment with mating apertures in the edges and sides of the studs S.

Preferably, the flanges 1004,1006 extend outwardly from the central section 1002 a sufficient distance to engage an outside surface or side of the set of two or more studs or other frame elements. As illustrated, corner portions of the flanges 1004,1006 may be rounded or trimmed to eliminate sharp corners.

In one embodiment, fasteners such as bolts, rivets, metal screws or the like may be used to join the bracket to the studs when the studs or frame elements are metal (the bracket could also be welded or soldered to the studs, although such direct connection could be used to join the studs without the bracket) or by use of nails, screws or the like when the studs are wood. When so connected, the bracket engages the studs or frame elements, maintaining them in a close connected relationship. One advantage of the bracket is that it surrounds at least a portion of the studs or other frame elements, joining them and preventing their movement at least in part even without direct connection with fasteners. Another advantage is that the bracket can be disconnected, permitting the modular units to be separated, if desired.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A burner unit for a grill comprising:
   a burner conduit, said burner conduit being generally "U" shaped, having a first leg and a second leg and a curved connecting portion, said first and second legs spaced apart and extending generally parallel to one another, said burner conduit comprising a wall defining an interior passage through said first and second legs and said curved connecting portion, said wall having a plurality of apertures there through from said interior passage to an exterior thereof at least at said first leg and said second leg through which gas delivered to said burner conduit may escape for combustion; and
   a gas delivery conduit comprising:
   a central section having a first end and a second end, said first end comprising a gas inlet;
   first and second arms extending outwardly from said central section, said first arm connected to said first leg of said burner conduit and defining a fluid path from said central section to said interior passage through said first leg, and said second leg connected to said second leg of said burner conduit and defining a fluid path from said central section to said interior passage through said second leg,
   said central section defining a gas flow passage from said inlet to said first and second arms and said first and second arms defining closed gas flow passages therethrough to said first and second legs of said burner conduit;
   whereby gas is solely delivered to said interior of said burner conduit by delivering gas to said inlet of said gas delivery conduit and delivering that gas through the first and second arms of said gas delivery conduit to said first and second legs of said burner conduit.

2. The burner unit in accordance with claim 1 wherein said apertures are located in portions of said first and second legs facing one another.

3. The burner unit in accordance with claim 1 wherein said central section of said gas delivery conduit is located between said first and second legs of said burner conduit and extends generally parallel thereto, and wherein said first and second arms of said gas delivery conduit extend generally perpendicular to said central section of said gas delivery conduit and said first and second legs of said burner conduit.

4. The burner unit in accordance with claim 2 including a diverter positioned above said burner conduit.

5. The burner unit in accordance with claim 4 wherein said diverter is generally "U" shaped, having a first curved portion and a pair of leg portions extending therefrom.

6. The burner unit in accordance with claim 5 wherein one or more supports extend outwardly from said burner conduit and said diverter is supported by said one or more supports.

7. The burner unit in accordance with claim 1 wherein said first leg defines a first end of said burner conduit and said second leg defines a second end of said burner conduit, said first and second ends being substantially closed.

8. The burner unit in accordance with claim 7 wherein said second end of said central section of said gas delivery conduit is closed.

9. The burner unit in accordance with claim 1 wherein said gas delivery conduit and burner conduit are generally circular in cross-section.

10. The burner unit in accordance with claim 2 wherein said apertures are located only in said first and second legs.

* * * * *